No. 62,588.        PATENTED MAR. 5, 1867.
W. T. ADAMS.
REVOLVING WAIST BLOCK.

Witnesses:
Geo. W. Rothwell
J. Stewing

Munn & Co.
Attys for
Wm. T. Adams

United States Patent Office.

WILLIAM T. ADAMS, OF BALTIMORE, MARYLAND.

Letters Patent No. 62,588, dated March 5, 1867.

---

IMPROVED REVOLVING WAIST-BLOCK.

---

*The Schedule referred to in these Letters Patent and making part of the same.*

---

TO ALL WHOM IT MAY CONCERN:

Be it known that I, WILLIAM T. ADAMS, of the city and county of Baltimore, and State of Maryland, have invented a new and improved Revolving Waist-Block; and I do hereby declare the following to be a full, clear, and exact description of the same, sufficient to enable one skilled in the art to which the invention appertains to make use of it, reference being had to the accompanying drawings, which form a part of this specification, and in which—

Figure 1:
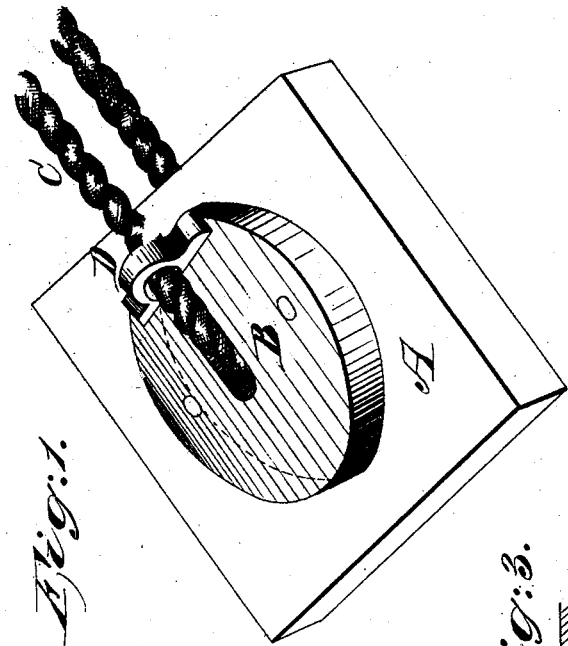
Figure 1 is a perspective view.
Figure 3:
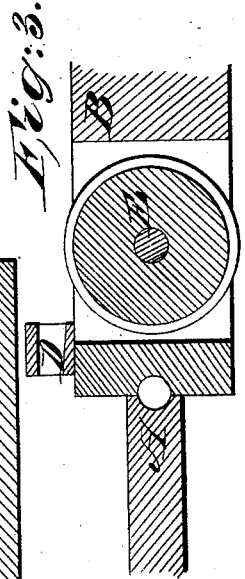
Figure 3 is a section at right angles to the axis of the sheave.
Figure 2:
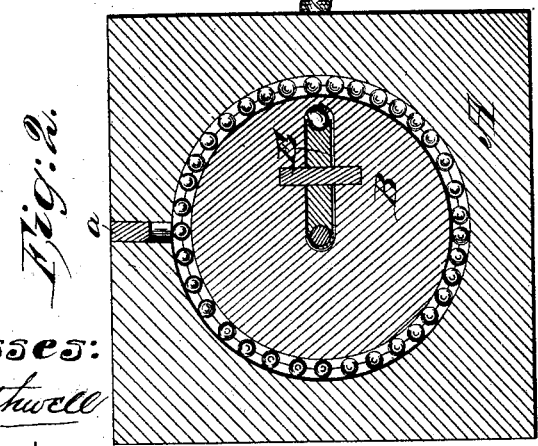
Figure 2 is a section at right angles to the axis of the rotating disk, in which the sheave is journalled.

The sheave, around which the sheet or other rope is passed, is journalled in a disk, which is permitted to rotate to keep the axis of the sheave at right angles to the direction of the rope. The sheave is journalled within the rotating disk, and projects from each of its faces, so as to deliver a rope, which passes round it without impediment, both ends in the same direction or near it. It is especially adapted for the sheets and other uses in the waist or on the deck of a vessel.

In the drawings, A may represent a portion of the bulwarks of a vessel, and B is a disk, so arranged as to rotate thereon, not an actual axis, but with anti-friction rollers or balls around its periphery, in a groove common to the disk and the surrounding dead-work. C may represent the sheet of one of the courses (or other rope) which passes through the guide-loop D and then around the sheave E, which is journalled in the disk B, so the sheet, at the middle of the curve it forms in bending, occupies a portion about axial to the disk B. As the sheet is hauled in, its direction becomes somewhat changed as the clew of the sail descends, and as it is sheeted home on the weather side it is at one end of its range.

The object of the invention is to enable the sheave always to rotate in a plane as nearly parallel as possible to the line of direction of the rope which passes over it, and thereby prevent the wearing away of the rope and the friction against the surfaces against which it rubs when it is not fairly presented to the sheave.

The anti-friction balls, which occupy the channel between the disk B and the dead-work A, may be introduced through an opening, G, which intersects the said channel, the hole being subsequently plugged to keep out extraneous matters.

Having described my invention, what I claim therein as new, and desire to secure by Letters Patent, is—

The waist-block sheave E, journalled within the rotating disk B, and projecting from its opposite faces, for the purpose and substantially in the manner described.

W. T. ADAMS.

Witnesses:
    D. G. WILL,
    W. J. ADAMS.